United States Patent
Takashima

(10) Patent No.: US 7,953,046 B2
(45) Date of Patent: May 31, 2011

(54) WIRELESS COMMUNICATIONS DEVICE

(75) Inventor: Mitsuhiro Takashima, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 98 days.

(21) Appl. No.: 12/230,972

(22) Filed: Sep. 9, 2008

(65) Prior Publication Data

US 2009/0080341 A1 Mar. 26, 2009

(30) Foreign Application Priority Data

Sep. 25, 2007 (JP) ................................ 2007-246397

(51) Int. Cl.
*H04W 4/00* (2009.01)
(52) U.S. Cl. ........................................ 370/332; 370/343
(58) Field of Classification Search .......................... None
See application file for complete search history.

(56) References Cited

U.S. PATENT DOCUMENTS

| 2007/0232341 A1* | 10/2007 | Sakata ........................... 455/509 |
| 2007/0291720 A1* | 12/2007 | Lee ................................ 370/338 |
| 2008/0159214 A1* | 7/2008 | Majonen et al. .............. 370/329 |
| 2009/0316801 A1* | 12/2009 | Nitta et al. .................... 375/260 |

FOREIGN PATENT DOCUMENTS

JP 2006-20156 1/2006

OTHER PUBLICATIONS

3GPP TS 36.211 V1.1.0 May 2007.

* cited by examiner

*Primary Examiner* — Jianye Wu
(74) *Attorney, Agent, or Firm* — Bacon & Thomas, PLLC

(57) ABSTRACT

A wireless communications device wirelessly communicates with a communication partner by allocating communication resource areas thereto on a communication resource area basis. The wireless communications device includes a receiving unit for receiving, from the communication partner, communication quality information parts of the communication resource areas allocated to the communication partner from the communication partner; an estimation unit for estimating communication quality information on another communication resource area among the communication resource areas allocated to the communication partner based on the communication quality information on the parts of communication resource areas received by the receiving unit; and a scheduling unit for allocating the communication resource areas based on the communication quality information on the communication resource areas received by the receiving unit and the communication quality information on said another communication resource area estimated by the estimation unit.

8 Claims, 3 Drawing Sheets

WIRELESS COMMUNICATIONS DEVICE

FIELD OF THE INVENTION

The present invention relates to a wireless communications device for receiving wireless quality information on frequency subbands from a communication partner; and, more particularly, to a wireless communications device for estimating wireless quality information on another frequency subband based on wireless quality information on a received frequency subbands.

BACKGROUND OF THE INVENTION

There are wireless communications systems which facilitate wireless communications between a wireless base transceiver station (BTS) and terminals by using the Orthogonal Frequency Division Multiplexing (OFDM) scheme (see, e.g., Reference 1).

In a downlink from the wireless BTS to a terminal in the OFDMA (OFDM Access) system, the wireless BTS allocates transmission data to frequency subbands of better wireless quality, thereby improving throughput.

In order for the wireless BTS to allocate the transmission data to a better wireless quality subband in a frequency domain, the terminal informs the wireless BTS on the wireless quality of the frequency subbands of the downlink through an uplink from the terminal to the wireless BTS.

In this case, if the terminal informs the wireless BTS on the wireless quality for all the frequency subbands of the downlink, the uplink can be congested. Therefore, there has been suggested a method, wherein the terminal informs the wireless BTS on only a few frequency subbands of wireless quality in the downlink except for those of poor wireless quality.

Further, CQI (Channel Quality Indicator) information is used as the wireless quality information.

FIG. 3 describes an example of the method for reporting top n CQIs from the terminal to the wireless BTS, wherein n is an integer equal to or greater than 1.

In this example, CQIs of five frequency subbands A, B, C, D and E are detected from a single terminal and the three top CQIs, i.e. the CQIs of the subbands B, C and D are reported to the wireless BTS. The CQIs of the subbands A and E are not reported to the wireless BTS.

[Reference 1] Japanese Patent Laid-open Publication No. 2006-020156

[Reference 2] 3GPP TS 36.211 V1.1.0 (May 2007)

However, in the system of reporting the wireless quality (CQI) from the terminal to the wireless BTS as described above, if the wireless quality of poor wireless quality frequency subband is not reported even one time, the quality of that frequency subband is totally unknown to the BTS. Further, if a frequency subband whose wireless quality was good and thus reported to the BTS suffers from an abrupt quality degradation, the wireless quality thereof will not be reported due to its poor wireless quality and may still be regarded as a good wireless quality frequency subband. Therefore, the wireless BTS cannot perform proper scheduling in the frequency domain, which results in a lower throughput.

SUMMARY OF THE INVENTION

In view of the above, the present invention provides a wireless communications device capable of performing precise scheduling by estimating communication quality information on another communication resource area, e.g., a frequency subband, based on communication quality information on a communication resource area reported from a communication partner.

In accordance with an aspect of the present invention, there is provided a wireless communications device for wirelessly communicating with a communication partner by allocating a plurality of communication resource areas thereto. The communication resource area is divided based on either a frequency domain or a frequency and a time domain.

The wireless communications device includes a receiving unit for receiving, from the communication partner, communication quality information parts of the communications resource area allocated to the communication partner; an estimation unit for estimating communication quality information on another communication resource area among the communication resource areas allocated to the communication partner based on the communication quality information on the parts of the communication resource areas received by the receiving unit; and a scheduling unit for performing communication resource area allocation based on the communication quality information on the communication resource areas received by the receiving unit and the communication quality information on said another communication resource area estimated by the estimation unit.

Therefore, by estimating the communication quality information on said another communication resource area based on the communication quality information on the communication resource area which is reported from the communication partner, better scheduling can be achieved, e.g., by using the reported communication quality information on the communication resource areas and the estimated communication quality information on another communication resource area.

Herein, various wireless communications devices may be used. For example, communications devices of a variety of wireless communications systems, e.g., wireless BTSs or terminals, or broadcasting devices may be used.

Further, as the wireless communications device, it is preferable to use devices for transmitting data by using OFDM.

The frequency range may be specified in all or part of a plurality of subcarriers in OFDM.

The time range may be specified in all or part of a plurality of symbols in OFDM. Here, the plurality of symbols may refer to the symbols included in one slot.

Further, as the communication resource area, resource blocks or n resource elements, n being a predetermined number greater than or equal to one, in OFDM may be used.

The communication resource area may be divided based on the frequency if it is not divided based on time. Otherwise, the communication resource area may be divided based on time as well as the frequency.

Various numbers of the communication resource areas may be allocated to the communication partner and, for example, they may be varied depending on the communication situation. Depending on the communication situation, no or one communication resource area can be allocated to the communication partner.

The number of the communication resource areas reporting communication quality information among the communication resource areas allocated to the communication partner may be varied. For example, the number of the communication resource areas reporting communication quality information or the number of the communication resource areas that do not report communication quality information may be determined in advance. Any part of the communication resource areas may be used to report the communication quality information and, for example, a predetermined number of communication resource areas of top communication quality are used.

A variety of information may be used as the communication quality information. For example, reception power of a pilot signal may be used as CQI information of the pilot signal. Generally, an amplitude or phase of the pilot signal uses a reference value and is classified into transmitting and receiving sides.

Various methods may be used to estimate communication quality information on another communication resource area based on communication quality information of the communication resource area which is reported from the communication partner.

If there are at least two communication resource areas each of which communication quality is to be estimated, the same communication quality in common for those communication resource areas can be estimated and used. On the other hand, the communication quality for each of at least two communication resource areas can be separately estimated and used.

Various methods for scheduling, i.e. allocating the communication resource areas, may be used.

Further, scheduling, i.e. allocating the communication resource areas, is performed by considering a plurality of communication partners based on the communication quality information reported from the communication partners and the communication quality information estimated from the reported communication quality information. For example, the communication resource areas are respectively allocated to the communication partners with better communication quality so that overall communication quality can be improved.

The wireless communications device in accordance with the present invention is illustrated in a following configuration.

That is, the communication quality information is expressed by a value indicating communication quality.

The estimation unit may obtain the estimated communication quality information on said another communication resource area by subtracting a predetermined offset value from communication quality information on one of the communications resource areas received by the receiving unit. The offset value is decreased as the distance between the communication resource area to be estimated and said one of the communication resource areas used for estimation decreases. In other words, the offset value is increased as the distance between the communication resource area to be estimated and said one of the communication resource areas used for estimation increases.

Therefore, the communication quality information can be easily obtained by estimating the communication quality information on another communication resource area from the communication quality information on one communication resource area by using the offset value. Further, high-precision scheduling may be achieved by adjusting the offset value based on the distance between the communication resource areas.

Here, arbitrary communication quality information on one communication resource area among the communication quality information of the communication resource areas reported from the communication partner may be used to estimate the communication quality information. For example, information on the communication resource area of the worst communication quality or information on the closest communication resource area to the communication resource area to be estimated may be used.

Further, the distance in the frequency direction, distance in the time direction or planar distance in the time-frequency plane may be used for the distance between the communication resource areas.

Further, the offset value may have an upper or lower limit. Furthermore, the value obtained by subtracting the offset value from the communication quality information may have a lower limit.

As described above, in accordance with the wireless communications device of the present invention, scheduling with high precision can be achieved by estimating the communication quality information on another communication resource area based on the communication quality information on the communication resource area which is reported from the communication partner.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Resource block (RB), scheduling and wireless quality (CQI) will be described first.

Figure 4:
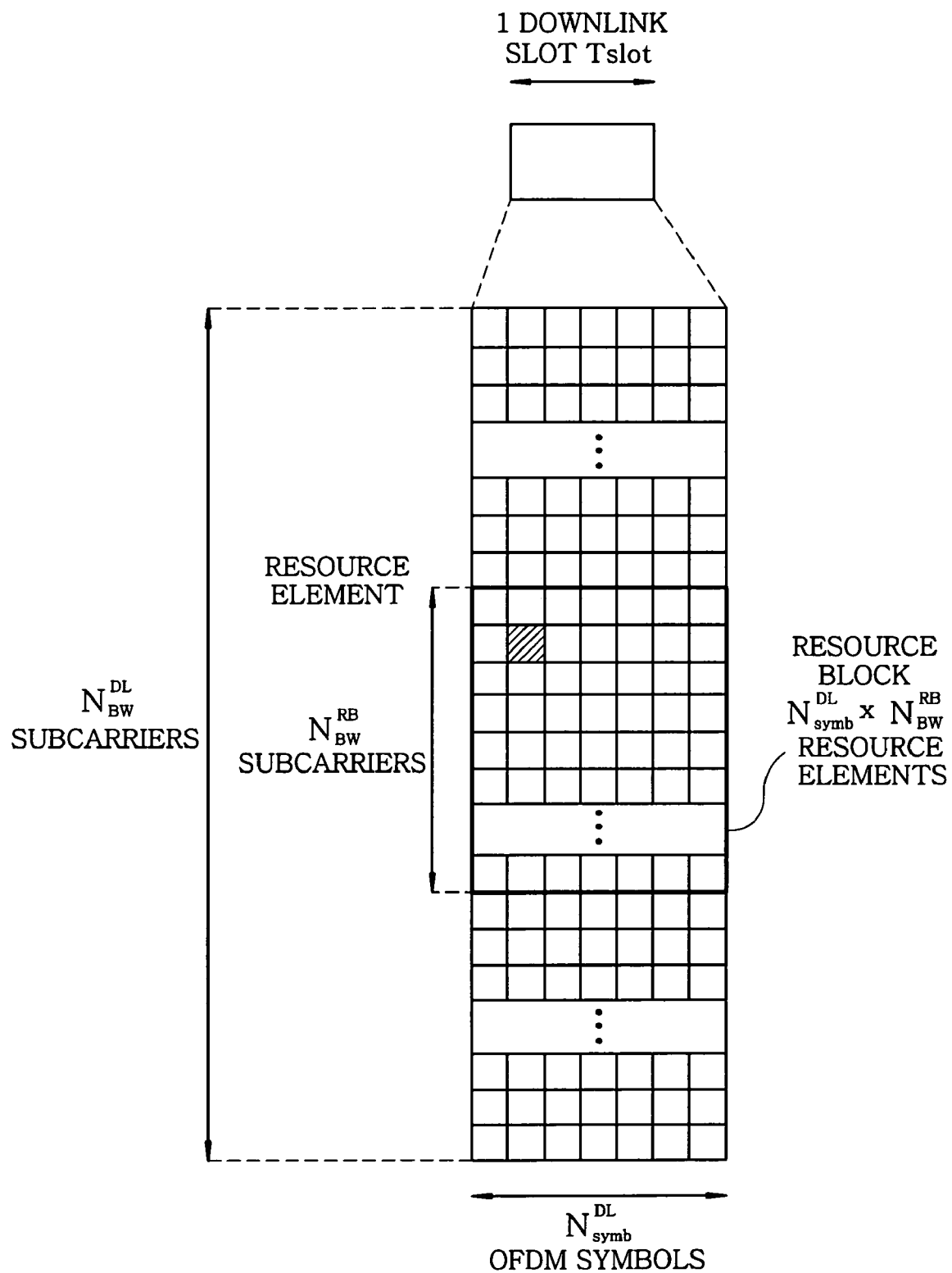
FIG. 4 illustrates an exemplary resource grid in a downlink of the OFDM method.

FIG. 4 illustrates an example of resource grid in a downlink of OFDM method (see, e.g., Reference 2).

In a single downlink slot, there are $N_{Symb}^{DL}$ OFDM symbols in the horizontal time axis in FIG. 4 and $N_{BW}^{DL}$ subcarriers in the vertical frequency axis in FIG. 4. A region surrounded by a single OFDM symbol and a single subcarrier is defined as a resource element is defined as.

Further, a resource block is defined as a set of $N_{Symb}^{DL} \times N_{BW}^{RB}$ resource elements, i.e., a region surrounded by $N_{Symb}^{DL}$ resource elements in a row in the OFDM symbol direction and $N_{BW}^{RB}$ resource elements in a row in the subcarrier direction.

A plurality of sequential downlink slots each of which has the configuration shown in FIG. 4 is used for communication, for example.

In this case, the same resource block and resource elements in the downlink slots are reported at each slot cycle if no modification is made.

The wireless BTS (BTS) performs wireless communications, e.g., with a plurality of terminals (users) by using OFDM.

As an example of scheduling by the wireless BTS, resource blocks are allocated to a channel of each terminal for the wireless communications with that terminal.

In the embodiment, resource blocks are allocated to a common control channel and/or data channel, wireless qualities (CQIs) are detected by terminals based on the communication condition of pilot signals and then the wireless BTS performs scheduling on, e.g., the data channel by using the detected result.

Here, for example, pilot signals can be allocated to all OFDM symbols and all subcarriers in the common control channel. Further, data signals can be basically allocated in the data channel. However, pilot signals can also be allocated to some of OFDM symbols and subcarriers in the data channel for example.

Various methods may be used for scheduling so that the wireless communication between a wireless BTS and a plurality of terminals can be improved as a whole for example. To be specific, if the wireless quality (CQI) of a certain resource block for a terminal is good, the resource block is continuously used as it is. On the contrary, if the wireless quality (CQI) of a certain resource block for a terminal is degraded, the resource block is reserved for use in another terminal and a different resource block to improve the wireless quality (CQI) is allocated to the terminal.

Specific examples of the resource block or scheduling have been described above but various modifications may be applied.

For example, other than allocating one resource block to one channel of a terminal, one resource block may be allocated to a plurality of terminals, i.e. a plurality of channels. Further, one or more resource elements may be used as an allocation unit.

Further, while the scheduling described above is performed for data transmitted from the wireless BTS to the terminals, such scheduling can be performed for data transmitted from the terminals to the wireless BTS as well.

In this embodiment, CQI information is used as the wireless quality information. The CQI refers to the power of the reception signal. The greater the CQI is, the better the quality is.

For example, if the allocation is performed on a resource block basis, the power of a pilot signal included in one resource block may be detected as the CQI. If a resource block includes a plurality of pilot signals, the average power of the pilot signals may be detected as the CQI.

The CQI has a discrete (digital) value in the range of, e.g., 1 to 30. In this case, the lower limit is 1 and the upper limit is 30. The CQI may be arbitrarily defined in each system.

In the present embodiment, the CQI is not detected from the data signals. Instead, if there is an error in the received data signal, the receiving side requests the transmission side to send it again or to raise the transmission power.

The wireless BTS performs scheduling by allocating frequency subbands (e.g., resource blocks) used for the wireless communication of terminals based on the CQIs for a plurality of frequency subbands, e.g., resource blocks, reported from the terminals. Since communication characteristics such as frequency characteristics of a specific terminal may be generally different from those of another terminal in a same frequency subband, it is preferable to allocate the frequency subband to the proper terminal for better frequency characteristics.

Hereinafter, the wireless BTS of the embodiment in accordance with the present invention will be described.

Figure 1:
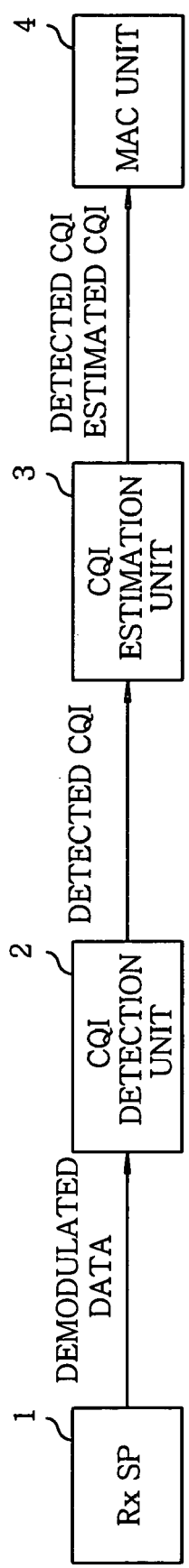
FIG. 1 shows a configuration view of an exemplary wireless BTS in accordance with an embodiment of the present invention.

FIG. 1 shows a configuration view of the wireless BTS of the embodiment.

The wireless BTS includes a reception signal processing unit (Rx_SP) 1, a CQI detection unit 2, a CQI estimation unit 3 and a MAC (Medium Access Control) unit 4.

An exemplary process performed by the wireless BTS of the embodiment will be described.

The wireless BTS in the preferred embodiment performs wireless communications with a plurality of terminals. The wireless BTS performs scheduling by allocating a frequency subband (e.g., a resource block) to a data channel for each terminal in the downlink. In the present embodiment, a plurality of frequency subbands may be allocated to a data channel of a single terminal.

Each terminal reports wireless quality (CQI) information on each frequency subband allocated thereto to the wireless BTS. At that time, while wireless qualities (CQIs) are detected from m frequency subbands allocated to each terminal where m is an integer greater than 1, the wireless qualities (CQIs) of the frequency subbands having the n best wireless qualities, i.e. top n CQIs are reported to the wireless BTS, where n is less than m (n<m).

Further, only one frequency subband may be allocated to a data channel of one terminal depending on the communication condition In the reception signal processing unit 1 that processes a baseband signal of a reception signal, reception data is demodulated from the wireless signal transmitted to an antenna (not shown) from a terminal serving as a communication partner and the demodulated data is outputted to the CQI detection unit 2. The demodulated data includes CQI information from the terminal.

The CQI detection unit 2 detects downlink frequency subband CQI included in the demodulated data inputted from the reception signal processing unit 1 and transmits the detected CQI to CQI estimation unit 3.

The CQI estimation unit 3 estimates the CQI of each of one or more frequency subbands not reported from the terminal based on one or more CQIs outputted from the CQI detection unit 2. Then, the CQI estimation unit 3 sends the CQIs reported from the terminal, i.e. the detected CQIs, and estimated CQIs to the MAC unit 4.

The MAC unit 4 allocates, e.g., a plurality of frequency subbands used for the wireless communication through the data channel of each terminal by scheduling transmission data of each terminal based on the CQIs from the CQI estimation unit 3, i.e. the detected CQIs and estimated CQIs. Real-time scheduling can be provided by performing such scheduling all the time or regularly.

Next, a method for estimating CQIs by using the CQI estimation unit 3 will be described.

Figure 2:
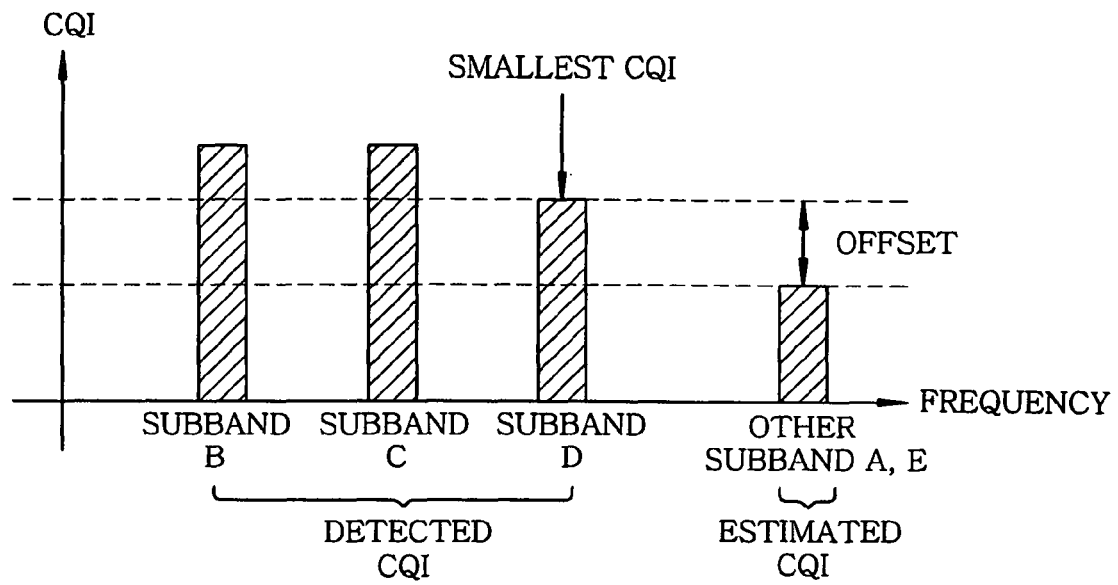
FIG. 2 describes an example of a method of estimating an unreported CQI in accordance with an embodiment of the invention.
Figure 3:
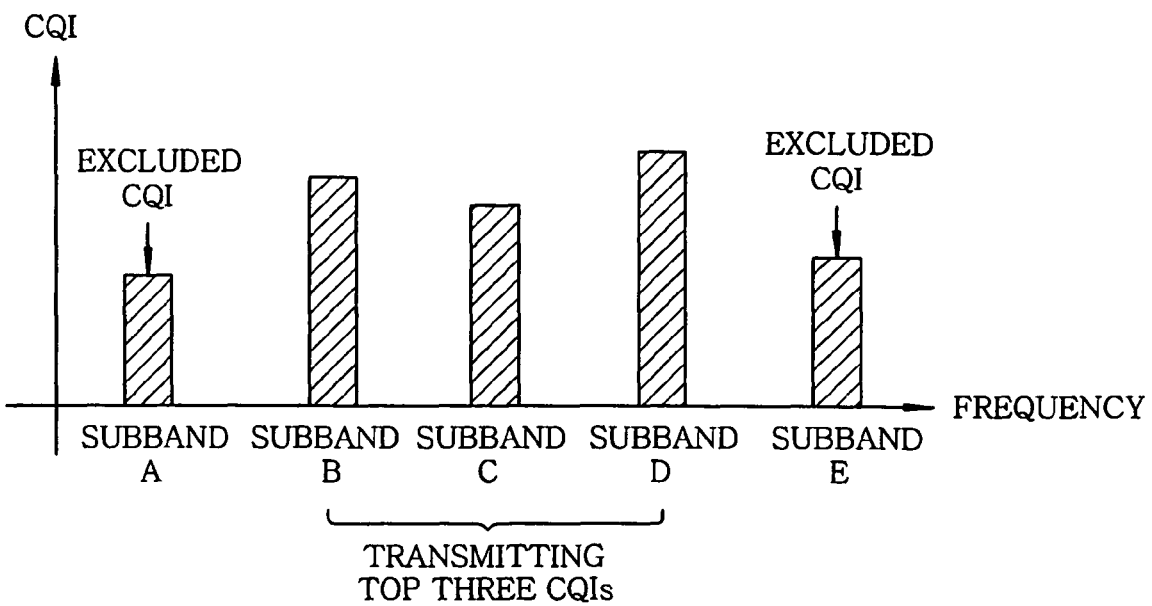
FIG. 3 describes an example of a conventional method of reporting top n CQIs.

FIG. 2 describes an example of the method for reporting the top n CQIs from the terminal to the wireless BTS, where n is an integer equal to or greater than 1.

In this example, CQIs of the five frequency subbands A, B, C, D and E are detected in a single terminal and top three CQIs, herein, CQIs of the subbands B, C and D, are reported to the wireless BTS. On the other hand, CQIs of the subbands A and E are not reported to the wireless BTS.

The CQI estimation unit 3 of the wireless BTS searches for the smallest CQI among the CQIs which are reported from the terminal due to their relatively fine wireless quality. In FIG. 2, the CQI of the subband D is detected as the smallest CQI.

Thereafter, the CQI estimation unit 3 subtracts a predetermined offset from the smallest CQI detected and assumes the resultant value as the CQI of the not reported frequency subband. In FIG. 2, the value obtained by subtracting the predetermined offset from the CQI of the subband D is assumed as the CQI of another subband such as A or E. Since the wireless BTS performs scheduling, i.e., allocating the frequency subbands, the frequency subband that is excluded from report of its CQI can be detected.

Herein, the offset may have an arbitrary value and it may be stored in a memory of the wireless BTS in advance.

In the embodiment, the CQI is a discrete (digital) value in the range of, e.g., 1 to 30.

For example, if the offset value is 2 and the smallest CQI among the reported ones is 2 or 1, the estimated CQI from which the offset value has been subtracted is 0 or −1. Therefore, if the value obtained by subtracting the offset value from the smallest CQI is less than the lower limit of the CQI in this embodiment, the estimated CQI is set equal to the lower limit of the CQI, i.e., 1 in this example.

When the CQI of the frequency subband which was not reported to the wireless BTS is estimated by using the offset, the estimated CQI may not be equal to the real CQI. Since, however, precision of scheduling can be generally improved if more CQIs are provided, somewhat correctly estimated CQIs are better than no CQI information for the frequency subband which was not reported.

Another method for estimating CQIs will be described hereinafter.

While the offset is constant in the above-described embodiment, it may be reduced as the distance between the frequency subband to be estimated and the frequency subband of which CQI reported and used in estimation decreases. The relationship between the distance between the frequency subbands and the offset may be stored, e.g., in a look-up table or the like of a memory in advance or it may be calculated by using an equation based on a predetermined proportional relationship.

If the resource block or the like is used, the distance in the OFDM symbol (time) direction, distance in the subcarrier (frequency) direction or linear distance on the plane of the OFDM resource grid as shown in FIG. 4 may be used as the distance between the frequency subbands.

While the CQI of the frequency subband excluded from the report is estimated from the smallest CQI among the CQIs of the reported frequency subbands, it can be estimated by using, among the CQIs of the reported frequency subbands, the CQI of the closest frequency subband to the frequency subband to be estimated.

Further, while the CQI of the frequency subband excluded from the report is estimated from the single CQI of the reported frequency subband, it can be estimated by using at least two CQIs of the reported frequency subbands. To be specific, the CQI can be estimated by averaging CQIs of two or more reported frequency subbands around the frequency subband, e.g., a resource block, of which CQI is to be estimated, without weighting or with weighting.

As to weighting, as the frequency subbands are closer to each other, more weight may be applied. The relationship between the distance between the frequency subbands and the weight can be stored, e.g., in a look-up table of a memory in advance or it can be calculated by using an equation based on a predetermined inverse proportional relationship.

In this case, as the reported CQIs of the frequency subbands to be used in estimating the CQI of the frequency subband, CQIs of a predetermined number (more than 1) of frequency subbands closest to the frequency subband of which CQI is to be estimated or CQIs of all the reported frequency subbands in a predetermined distance (it can be only one) can be used.

In the wireless communications system of the embodiment described above, not CQIs of all the frequency subbands but only top few selected CQIs are reported in the uplink from the terminal to the wireless BTS so that congestion of the uplink caused by CQI report can be avoided.

Further, since the wireless BTS in the embodiment estimates the CQI of the frequency subband which was not reported based on the CQIs of the frequency subbands having good wireless quality reported from the terminal and uses the estimated result in scheduling, scheduling on the frequency domain can be performed with better precision, which results in improved wireless quality and increased throughput.

The present invention may be applied to various systems, which schedules transmission data on the frequency subband of high wireless quality in the frequency domain and selects CQIs to be reported to the transmission side from the receiving side, as in the OFDMA.

Further, in the wireless BTS (an example of the wireless communications device) of the embodiment, the antenna and reception signal processing unit 1 for receiving the wireless CQIs (an example of the communication quality information) of the frequency subbands (an example of the communication resource areas) from the terminal (an example of the communications partners) serves as a receiving unit and the CQI estimation unit 3 for estimating the CQI of another frequency subband based on the CQIs of the frequency subband(s) detected by the CQI detection unit 2 serves as an estimation unit. Further, the MAC unit 4 for scheduling, i.e. allocating the frequency subbands, based on the detected CQIs and the estimated CQI serves as a scheduling unit.

The structure of the system or device of the present invention is not limited to the above-described embodiments, but various structures may be used. The present invention may be implemented in the form of the method or scheme for performing the processes of the present invention, and thus the program for realizing the method and/or the storage medium storing the program can be provided to various systems or devices to implement the present invention.

Further, the application field of the present invention is not limited to the above-described embodiments, but the present invention may be applied to various fields.

Further, the system or device in accordance with the present invention can be configured to have hardware resources including a processor and a memory wherein the processor executes a control program stored in the memory (ROM) to control the various processes of the system or device. Further, each functional unit for performing the corresponding process may be configured as an independent hardware circuit.

The scope of the present invention encompasses a computer-readable storage medium such as a floppy disk (registered trademark) or a CD (Compact Disc) ROM storing therein the above-described control program and the control program itself. In this case, the control program can be loaded to the computer from the storage medium so that the control program can be executed by the processor.

While the invention has been shown and described with respect to the preferred embodiments, it will be understood by those skilled in the art that various changes and modifications may be made without departing from the spirit and scope of the invention as defined in the following claims.

What is claimed is:

1. A wireless communications device for wirelessly communicating with a communication partner by allocating a plurality of frequency subbands to the communication partner, the allocated frequency subbands being divided based on either a frequency domain or a frequency and a time domain, the wireless communications device comprising:

a receiving unit for receiving, from the communication partner, communication quality information regarding each of one or more first frequency subbands, the one or more first frequency subbands being part of the allocated frequency subbands;

an estimation unit for estimating communication quality information of a second frequency subband based on the communication quality information of each of the one or more first frequency subbands received by the receiving unit, the second frequency subband being part of the allocated frequency subbands and being different from the first frequency subbands; and a scheduling unit for allocating, to the communication partner, at least a part of the plurality of frequency subbands based on the communication quality information of each of the one or more first frequency subbands received by the receiving unit and the communication quality information of the second frequency subband estimated by the estimation unit, wherein the communication quality information of each of the one or more first frequency subbands is expressed by a value indicating communication quality, and wherein the estimation unit obtains the estimated communication quality information of the second frequency subband by subtracting an offset value from the communication quality information of one of the first frequency subbands.

2. The wireless communications device of claim 1, wherein the wireless communications device is a wireless base transceiver station.

3. The wireless communications device of claim 1, wherein the communication partner is a wireless terminal.

4. The wireless communications device of claim 1, wherein the communication quality information of the second frequency subband is not received by the receiving unit.

5. The wireless communications device of claim 1, wherein the offset value is decreased as the distance between the second frequency subband and said one of the first frequency subbands used for estimation decreases.

6. The wireless communications device of claim 1, wherein the communication quality information of said one of the first frequency subbands is the smallest among the values of the communication quality information of the one or more first frequency subbands.

7. The wireless communications device of claim 6, wherein when a value obtained by said subtracting is less than a threshold, the estimated communication quality information of the second frequency subband is set equal to the threshold.

8. A wireless communications system comprising:

a wireless terminal;

a wireless base transceiver station (BTS) for wirelessly communicating with the wireless terminal by allocating a plurality of frequency subbands to the wireless terminal, the allocated frequency subbands being divided based on either a frequency domain or a frequency and a time domain, wherein the wireless terminal detects communication quality of the allocated frequency subbands and transmits communication quality indicator (CQI) information regarding each of one or more of the allocated frequency subbands to the wireless BTS, and wherein the wireless BTS includes:

a receiving unit for receiving the CQI information of each of the one or more allocated frequency subbands;

an estimation unit for estimating CQI information of another frequency subband among the allocated frequency subbands based on the received CQI information; and a scheduling unit for allocating, to the wireless terminal, at least a part of the plurality of frequency subbands based on the received CQI information and the estimated CQI information, wherein the CQI information of each of said one or more allocated frequency subbands is expressed by a value indicating communication quality, and wherein the estimation unit obtains the estimated CQI information of the another frequency subband by subtracting an offset value from the CQI information of one of the one or more allocated frequency subbands.

* * * * *